United States Patent
Bastide et al.

(10) Patent No.: US 11,556,498 B2
(45) Date of Patent: Jan. 17, 2023

(54) LONGEVITY MANAGEMENT OF SOCIAL NETWORK DATA

(71) Applicant: International Business Machines Corporation, Armonk, NY (US)

(72) Inventors: Paul R Bastide, Ashland, MA (US); Matthew E. Broomhall, Goffstown, NH (US); Jason Flood, Dublin (IE); Liam S. Harpur, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 17/089,844

(22) Filed: Nov. 5, 2020

(65) Prior Publication Data

US 2022/0138144 A1 May 5, 2022

(51) Int. Cl.
| | |
|---|---|
| G06F 16/00 | (2019.01) |
| G06F 16/11 | (2019.01) |
| G06F 16/9536 | (2019.01) |
| G06Q 50/00 | (2012.01) |
| H04L 67/306 | (2022.01) |
| G06Q 30/02 | (2012.01) |
| H04L 51/52 | (2022.01) |
| H04L 67/50 | (2022.01) |

(52) U.S. Cl.
CPC ........ *G06F 16/113* (2019.01); *G06F 16/9536* (2019.01); *G06Q 30/0201* (2013.01); *G06Q 50/01* (2013.01); *H04L 51/52* (2022.05); *H04L 67/306* (2013.01); *H04L 67/535* (2022.05)

(58) Field of Classification Search
CPC .............. G06F 16/113; G06F 16/9536; G06Q 30/0201; G06Q 50/01; H04L 51/32; H04L 67/22; H04L 67/306
See application file for complete search history.

(56) References Cited

U.S. PATENT DOCUMENTS

| | | |
|---|---|---|
| RE44,967 E | 6/2014 | Flinn |
| 9,501,659 B2 | 11/2016 | Carter |
| 10,382,528 B2 | 8/2019 | Rajagopalan |

(Continued)

OTHER PUBLICATIONS

Adamczyk, Ed, "Study predicts more dead Facebook users than living by 2070", United Press International, Inc., Apr. 29, 2019, 1 Page.

(Continued)

*Primary Examiner* — Hung Q Pham
(74) *Attorney, Agent, or Firm* — Stephanie L. Carusillo (57) ABSTRACT

In an approach to longevity management of social network data, a computer detects a posting of a social artifact by a first user of a social network. A computer stores the social artifact with associated identification information. A computer stores activity associated with the social artifact by one or more other users. A computer detects a status change in an account associated with the first user, wherein the status change indicates the first user is not active in the social network. In response to detecting the status change, a computer determines a second user from the one or more other users to which to transfer the social artifact based on the social artifact, the associated identification information, and the activity associated with the social artifact by the one or more other users. A computer transfers the social artifact to an account associated with the second user on the social network.

17 Claims, 4 Drawing Sheets

(56) References Cited

U.S. PATENT DOCUMENTS

| | | | |
|---|---|---|---|
| 2014/0108960 A1* | 4/2014 | Zaragoza | G06F 16/48 |
| | | | 715/753 |
| 2014/0194208 A1* | 7/2014 | Splaine | G06Q 30/02 |
| | | | 463/42 |
| 2015/0052153 A1 | 2/2015 | Rubinstein | |
| 2015/0326548 A1* | 11/2015 | Marson | G06Q 30/02 |
| | | | 726/4 |
| 2015/0365347 A1* | 12/2015 | Sanders | G06Q 50/01 |
| | | | 709/204 |
| 2017/0034182 A1 | 2/2017 | Marson | |
| 2019/0182342 A1 | 6/2019 | Goenka | |
| 2020/0125639 A1* | 4/2020 | Doyle | G06F 40/30 |

OTHER PUBLICATIONS

Anonymous et al., "Facebook for Developers", Facebook, Accessed on Sep. 9, 2020, 21 Pages.

Anonymous et al., "Gnip APIs, Documentation to help you integrate Gnip's APIs into your product", Twitter, Inc., Accessed on Sep. 9, 2020, 2 Pages.

IBM, "Natural Language Classifier", Accessed on Sep. 9, 2020, 11 Pages.

* cited by examiner

LONGEVITY MANAGEMENT OF SOCIAL NETWORK DATA

BACKGROUND OF THE INVENTION

The present invention relates generally to the field of data management, and more particularly to longevity management of social network data.

A social network service (also social networking site or social media) is an online platform that people use to build social networks or social relationships with other people who share similar personal or career interests, activities, backgrounds, or real-life connections. Social network services provide a space for interaction to continue beyond in-person interactions. The computer mediated interactions link members of various networks and may help to both maintain and develop new social and professional relationships. Social network services enable users to share ideas, digital photos and videos, posts, comments, and to inform others about online or real-world activities and events with people in their network.

SUMMARY

Embodiments of the present invention disclose a computer-implemented method, a computer program product, and a system for longevity management of social network data. The computer-implemented method may include one or more computer processors detecting a posting of a social artifact by a first user of a social network. One or more computer processors store the social artifact with associated identification information. One or more computer processors store activity associated with the social artifact by one or more other users. One or more computer processors detect a status change in an account associated with the first user, wherein the status change indicates the first user is not active in the social network. In response to detecting the status change in the account associated with the first user, one or more computer processors determine a second user from the one or more other users to which to transfer the social artifact based on the social artifact, the associated identification information, and the activity associated with the social artifact by the one or more other users. One or more computer processors transfer the social artifact to an account associated with the second user on the social network.

DETAILED DESCRIPTION

Communities, online social networks, and collaboration tools are connecting people and information in logical and organized ways to share and process information between users. The most common mechanisms of sharing and processing information on social networks include the channel, inbox, text messages, wall, activity stream, timeline, and profile. These mechanisms enable one to rapidly share information with others, connect, gather, and discuss many topics. When a user joins a social network, the user starts communicating, sending messages, and engaging with others. Unfortunately, at some point in the future, the user may separate from the social network, and the fruitful conversations in which the user has engaged are lost to history. There is a clear need to maintain posts to keep the posts viable and useful past the original intent.

Embodiments of the present invention recognize that users of social network services can benefit from a method of maintaining the sentiment, knowledge, and conversation of a user who has separated from the social network. Embodiments of the present invention also recognize that maintaining social artifacts of a user who has separated from the social network enables managing and contributing to the longevity of the social artifact, memories, and knowledge, and avoiding an issue where data is subsequently lost. Implementation of embodiments of the invention may take a variety of forms, and exemplary implementation details are discussed subsequently with reference to the Figures.

Figure 1:
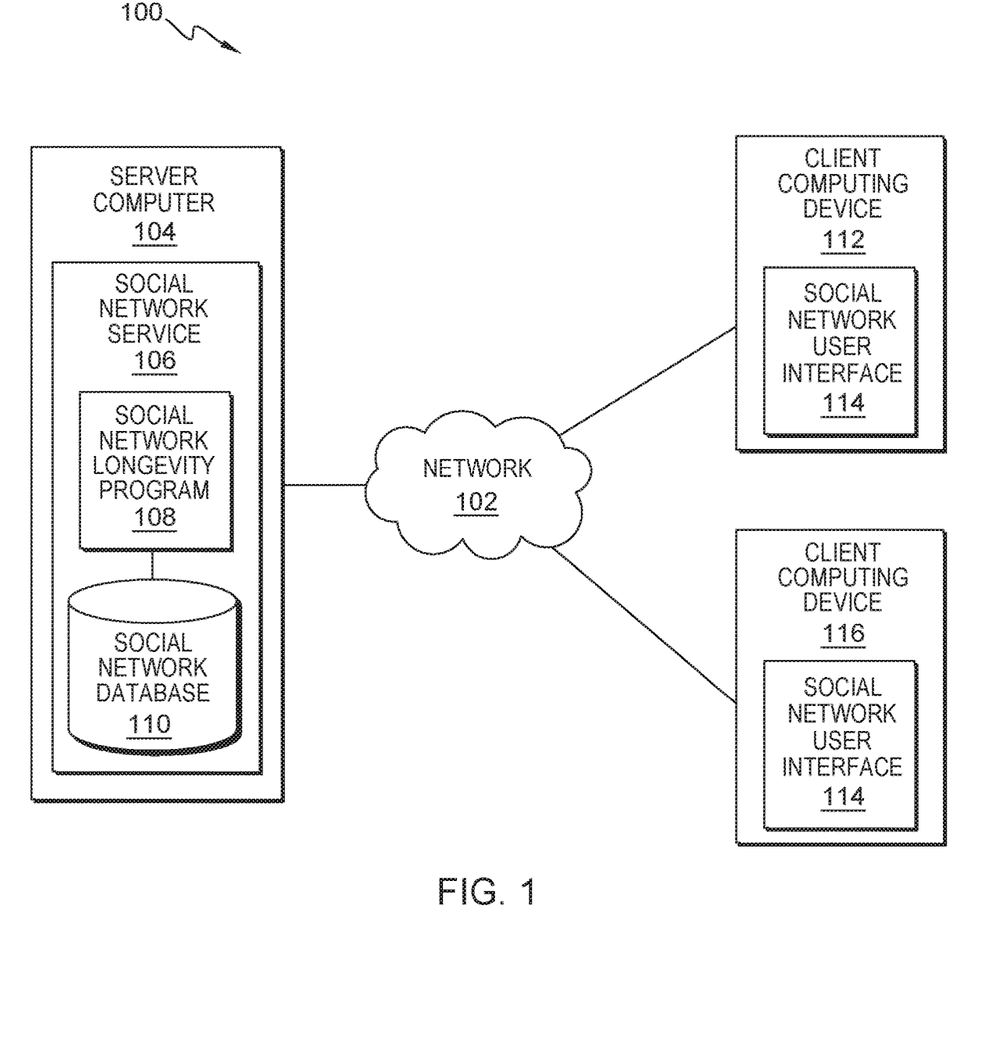
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104, client computing device 112, and client computing device 116, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 112, client computing device 116, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing device 112, client computing device 116, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes social network service 106, social network longevity program 108, and social network database 110. Server computer 104 may include internal and external hardware components, as depicted and described in further detail with respect to FIG. 4.

Social network service 106 is one of a plurality of platforms for building online social networks among people who share interests, activities, backgrounds, and/or real-life connections. Social network applications are web-based services that allow individuals to create a public or private profile, to create a list of users with whom to share connections, and to view and interact with the connections within the system. Social network applications may also include communication tools such as mobile connectivity, photo and video sharing, and blogging. Social network service 106 incorporates user generated content and facilitates the development of online social networks by connecting a user's profile with those of other individuals or groups. Social network service 106 includes social network longevity program 108.

Social network longevity program 108 enables longevity management of social artifacts of a social network user in order to maintain the sentiment, knowledge, and conversation of the user upon separation from the social network by transferring ownership of social artifacts to an active user associated with the inactive user. Social network longevity program 108 is not required to process social artifact data in real time, and has no limitations on processing in parallel, with the exception of jointly assigning a message identification and an associated conversation identification to a social artifact. In the depicted embodiment, social network longevity program 108 is integrated within social network service 106. In another embodiment, social network longevity program 108 may be a standalone program within distributed data processing environment 100, provided social network longevity program 108 has access to social network database 110 and social network user interface 114. Social network longevity program 108 detects a post of a social artifact by a first user on a social network, such as social network service 106. Social network longevity program 108 stores the post of the social artifact with associated identification information. Social network longevity program 108 stores activity of other users associated with the social artifact.

Social network longevity program 108 detects a status change of the first user with respect to the social network. Social network longevity program 108 determines the best second user associated with the first user and/or the social artifact. Social network longevity program 108 transfers the social artifact to the best second user. Social network longevity program 108 is depicted and described in further detail with respect to FIG. 2 and FIGS. 3A and 3B.

Social network database 110 is a repository for data used by social network service 106 and by social network longevity program 108. In the depicted embodiment, social network database 110 resides on server computer 104. In another embodiment, social network database 110 may reside elsewhere within distributed data processing environment 100, provided social network service 106 and social network longevity program 108 have access to social network database 110. A database is an organized collection of data. Social network database 110 can be implemented with any type of storage device capable of storing data and configuration files that can be accessed and utilized by social network service 106 and social network longevity program 108, such as a database server, a hard disk drive, or a flash memory. Social network database 110 stores data associated with social network users, sponsors, and followers. For example, social network database 110 stores user profile information, which may include, but is not limited to, name, nickname, address, phone number, email address, social network affiliation, job role, employer, relationship status, family information, preferences for various items, such as artifact transfers, approvals of artifact transfers, membership lists, definitions of social artifacts as public or private, etc. Social network database 110 may also store text, video, and images posted or saved by a user or a sponsor, as well as any activity performed by another user in association with the post. In addition, social network database 110 may store statistics and analyses associated with posted information. Further, social network database 110 may store a record of artifact transfers, including the original owner and current owner.

The present invention may contain various accessible data sources, such as social network database 110, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Social network longevity program 108 enables the authorized and secure processing of personal data. Social network longevity program 108 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Social network longevity program 108 provides information regarding personal data and the nature (e.g., type, scope, purpose, duration, etc.) of the processing. Social network longevity program 108 provides the user with copies of stored personal data. Social network longevity program 108 allows the correction or completion of incorrect or incomplete personal data. Social network longevity program 108 allows the immediate deletion of personal data.

Client computing device 112 and client computing device 116 can each be one or more of a laptop computer, a tablet computer, a smart phone, a smart watch, a smart speaker, or any programmable electronic device capable of communicating with various components and devices within distributed data processing environment 100, via network 102. Client computing device 112 and client computing device 116 may each be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch or a smart tattoo. In an embodiment, client computing device 112 and/or client computing device 116 may be integrated into a vehicle of the user. For example, client computing device 112 and/or client computing device 116 may include a heads-up display in the windshield of the vehicle. In general, client computing device 112 and client computing device 116 each represents one or more programmable electronic devices or combination of programmable electronic devices capable of executing machine readable program instructions and communicating with other computing devices (not shown) within distributed data processing environment 100 via a network, such as network 102. Client computing device 112 and client computing device 116 each includes an instance of social network user interface 114.

Social network user interface 114 provides an interface between social network service 106 on server computer 104 and a user of client computing device 112 and/or a user of client computing device 116. In one embodiment, social network user interface 114 is mobile application software. Mobile application software, or an "app," is a computer program designed to run on smart phones, tablet computers and other mobile devices. In one embodiment, social network user interface 114 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. Social network user interface 114 enables a user of client computing device 112 and/or a user of client computing device 116 to interact with other users of social network service 106, post text, video, and/or images on social network service 106, as well as any other actions associated with a social network, as would be recognized by a person of skill in the art. Social network user interface 114 may also enable a user of client computing device 112 and/or a user of client computing device 116 to input data and preferences to a user profile stored on social network database 110. In addition, social network user interface 114 may enable a user of client computing device 112 and/or a user of client computing device 116 to approve transfers of social artifacts.

Figure 2:
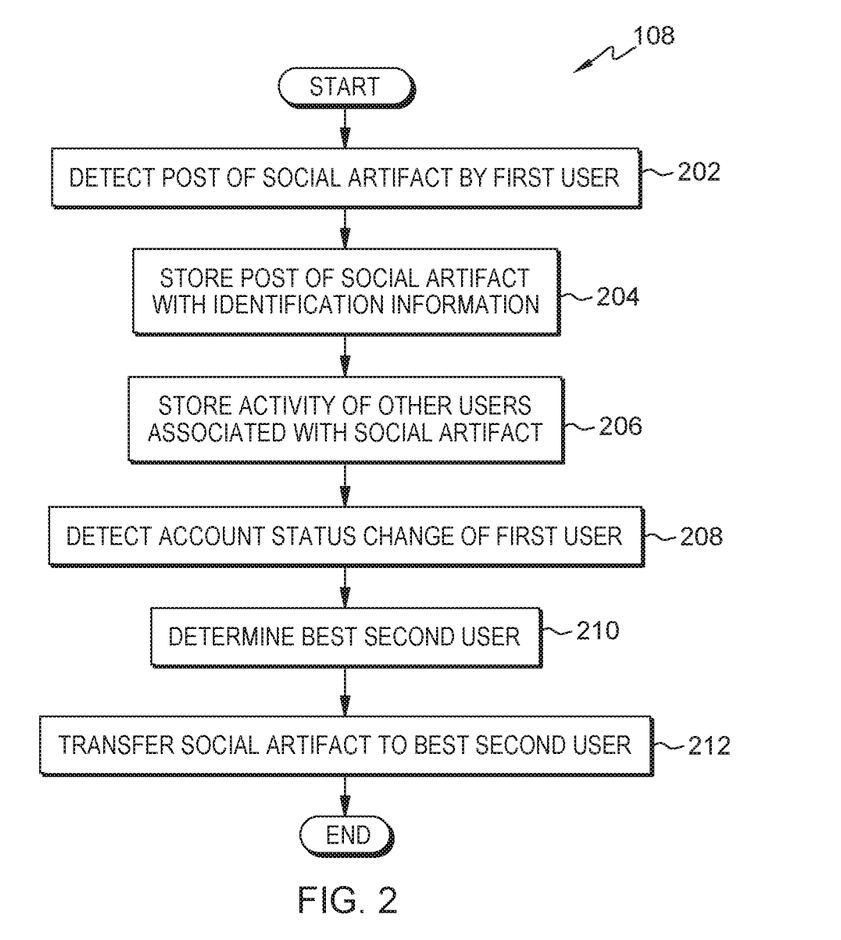
FIG. 2 is a flowchart depicting operational steps of a social network longevity program, on a server computer within the distributed data processing environment of FIG. 1, for longevity management of social network data, in accordance with an embodiment of the present invention.

FIG. 2 is a flowchart depicting operational steps of social network longevity program 108, on server computer 104 within distributed data processing environment 100 of FIG. 1, for longevity management of social network data, in accordance with an embodiment of the present invention.

Social network longevity program 108 detects a post of a social artifact by a first user (step 202). A social artifact is an item that a user of social network service 106 posts. A social artifact can include, but is not limited to, a message, comment or conversation posted as text, a still image, a video, an audio clip, any combination of the aforementioned items, etc. In an embodiment, when a user of client computing device 112 posts a social artifact to social network service 106, via social network user interface 114, social network longevity program 108 detects the post. In an embodiment, social network longevity program 108 uses a social media data aggregation service to interface with social network service 106 for gathering social artifacts posted to social network service 106. In an embodiment, social network longevity program 108 may detect a post via use of push method, where social network longevity program 108 receives a stream of messages, or a batch of messages, sent on a periodic basis, for example, 30 messages every 15 minutes. In another embodiment, social network longevity program 108 may detect a post via use of a pull feed, where social network longevity program 108 queries a real simple syndication (RSS) feed or an application programming interface (API) for the latest, i.e., most recent, posts, or for posts since a specific point in time. In a further embodiment, social network longevity program 108 may detect a post via a user interface extension to capture data on a screen associated with client computing device 112. For example, social network longevity program 108 may use a text command, a click on a menu, or an interceptor in a browser, and scrape the document object model, i.e., gather data in the current view of the screen, for elements of interest, converting the gathered text or images into a structure useful for analytics.

Social network longevity program 108 stores the post of the social artifact with identification information (step 204). In an embodiment, social network longevity program 108 adds the social artifact to social network database 110 and identifies the social artifact. For example, social network longevity program 108 may assign a message identifier (ID), a conversation ID, and a time of the post to the social artifact. In an embodiment, each new post of a social artifact triggers social network longevity program 108 to begin processing, i.e., storing the social artifact with associated identification information.

In an embodiment, social network longevity program 108 stores the social artifact and associated identification information in social network database 110 via a storage schema. In the embodiment, the schema includes: a unique message ID, which social network longevity program 108 can generate or extract from the message/post to uniquely identify the message; a conversation ID, to associate the message with an existing, unique conversation; access control, i.e., a membership list of the conversation, which, for example, can include the user that posted the social artifact as well as other users that interacted with the social artifact; and an owner of the message/post, i.e., the first user that initially posted the social artifact. In an embodiment, the access control, or membership, list may be provided by the owner. For example, the owner may define preferences, via social network user interface 114, for membership lists, such as the removal of a specific person from the conversation. In another example, the owner may define the visibility of the conversation. In an embodiment, social network longevity program 108 generates a conversation ID using membership lists. For example, social network longevity program 108 may select the first message in a thread to generate the conversation ID. In another example, social network longevity program 108 may select the embedded conversation or thread identifier to generate the conversation ID. Social network longevity program 108 generates the conversation ID in order to assign primary ownership to the social artifact. If social network longevity program 108 cannot determine the owner of a social artifact, then social network longevity program 108 deletes the social artifact. In an embodiment, social network longevity program 108 may annotate the conversation ID and the message ID with any regulatory restrictions related to the owner's data.

In an embodiment, social network longevity program 108 may store the social artifact and associated information in data storage in a distributed data processing engine (not shown). In an embodiment, social network longevity program 108 represents the tabular data on disk as a comma separated value file to enable distributed processing. In an embodiment, social network longevity program 108 stores the data on a regular basis, for example, on a daily basis, to limit data processing to specific time ranges. In another embodiment, social network longevity program 108 may store the social artifact and associated information at a time when a terminal is reached in a conversation, for example, when a conversation concludes, or when there are no updates to the conversation, such as likes or comments, within a pre-defined period of time, such as no updates in seven days.

In an embodiment, users may provide opt-in or opt-out parameters associated with preferences for data storage, via social network user interface 114. In an embodiment, social network longevity program 108 may label stored social artifacts and associated identification information as public or private, based on user preferences stored in social network database 110. For example, a user may prefer that messages directly between the user and a second user are labeled as private while messages posted to a public group are labeled as public. In another embodiment, where a corporation allows a user joint access to social network service 106 for work and home from a single account, the user may specify that social network longevity program 108 follows different data processing rules, specific to the user and/or the organization. In an embodiment, social network longevity program 108 may federate social artifacts across a plurality of social network services and de-duplicate messages based on, for example, time, message ID, conversation ID, or other universal unique identifiers.

Social network longevity program 108 stores activity of other users associated with the social artifact (step 206). In an embodiment, if there is activity, also referred to as metadata, on the social artifact performed by one or more other users, for example, a user of client computing device 116, then social network longevity program 108 stores the activity in social network database 110 in association with the social artifact. In one embodiment, social network longevity program 108 stores the metadata in a second table in social network database 110. Metadata may include modality data, such as whether another user read, liked, disliked, upvoted, or commented on the social artifact. Metadata may also include identification information associated with the other users. In an embodiment, social network longevity program 108 stores the activity of other users with the following identifiers: a correlation vector, such as the message ID and/or the conversation ID; person references, such as the user to whom the message was directed, a user copied on the message, and any textual references to other users; message details, such as the subject, the body, and any associated metadata, e.g., timestamp; and social modality actions, such as like, dislike, upvote, reply, comments, etc. In an embodiment, social network longevity program 108 can determine whether there is a connection between the user and another user that provided a modality action. For example, social network longevity program 108 can review profile data of one or more users to determine whether the users are connected on a second social network service or whether the users are in the same organization or report to the same manager.

In an embodiment, social network longevity program 108 may add a sentiment score and/or confidence to the activity of the other users, where the sentiment can apply to the original social artifact and any subsequent response, thus, providing a qualitative metric to describe the activity of another user with respect to the social artifact. For example, social network longevity program 108 may use a sentiment or tone analyzer, as would be recognized by one of skill in the art, to assign a sentiment to the social artifact and any subsequent responses, and determine a confidence in the assigned sentiments in a range of 0 to 10. In a further embodiment, social network longevity program 108 may also extract information from a profile of the other users to determine the expertise and familiarity of the other user with a concept or topic of the social artifact.

Social network longevity program 108 detects an account status change of the first user (step 208). In an embodiment, social network longevity program 108 detects an account status change of the first user when the first user is no longer active in social network service 106. In an embodiment, social network longevity program 108 determines the first user is no longer active in social network service 106 when there is no activity by the first user for a pre-defined threshold period of time. For example, social network longevity program 108 determines there has been no activity of the first user on social network service 106 for six months. In another embodiment, social network longevity program 108 may detect an account status change of the first user when social network service 106 removes the account of the first user for administrative or other reasons. In a further embodiment, social network longevity program 108 may detect an account status change if the first user changes a setting, via social network user interface 114, that indicates a change in account status. In an embodiment, social network longevity program 108 may confirm a change in account status by reaching out to the first user. For example, social network longevity program 108 may send an email to the first user to request a confirmation of the account status change. In the embodiment, social network longevity program 108 may confirm the change in account status after there is no response to the confirmation request after a pre-defined period of time. In an embodiment, social network longevity program 108 may detect an account status change upon receipt of a legal change of the first user by social network service 106. In another embodiment, social network longevity program 108 may detect an account status change upon receipt of an account separation notice by social network service 106 from the first user. In yet another embodiment, social network longevity program 108 may detect an account status change upon receipt of a delete or forget me notice by social network service 106 from the first user. In a further embodiment, social network longevity program 108 may detect an account status change of the first user based on a vote of members in the current or historic social network of the first user. In an embodiment, social network longevity program 108 may predict a likely separation of the user from social network service 106 based on a lack of activity by the first user for a pre-defined threshold period of time. In an embodiment, if social network longevity program 108 detects no activity by the first user for a pre-defined threshold period of time, then social network longevity program 108 predicts a separation of the first user from social network service 106, and social network longevity program 108 can query the user regarding potential transfers of social artifacts to one or more other users. In the embodiment, social network longevity program 108 may also query the first user as to whether there is any content the first user prefers to be deleted or hidden.

Social network longevity program 108 determines a best second user (step 210). In an embodiment, social network longevity program 108 determines the best second user to whom to transfer ownership of the social artifact posted by the first user based on association of the plurality of actions on the social artifact, i.e., the metadata, by the one or more other users. In an embodiment where the social artifact was posted across federated social network services, social network longevity program 108 may find the best second user for all of the federated social network services, or social network longevity program 108 may find multiple best second users for different social network services. In an embodiment, if social network longevity program 108 predicts a separation of the first user from social network service 106, then social network longevity program 108 can query the first user regarding the best second user for potential transfers of social artifacts. In the embodiment, social network longevity program 108 may request approval from the first user for transfer of the social artifact to one or more other users. In an embodiment, social network longevity program 108 may determine that the best second user is two or more other users. In an embodiment, social network longevity program 108 can run a simulation of a deactivation or removal of the first user from social network service 106 in order to trigger the determination of the best second user. Additional detail on how social network longevity program 108 determines the best second user is described in further detail with respect to FIGS. 3A and 3B.

Social network longevity program 108 transfers the social artifact to the best second user (step 212). In an embodiment, social network longevity program 108 transfers ownership of the social artifact to the best second user, for example, the user of client computing device 116. In an embodiment, social network longevity program 108 may wait for a pre-defined amount of time to elapse prior to transferring the social artifact to the best second user. In an embodiment, social network longevity program 108 documents the change of ownership by storing the new ownership in social network database 110. In an embodiment, upon completing the transfer of the social artifact, social network longevity program 108 may close the account of the first user.

In an embodiment, social network longevity program 108 may transform the content of the social artifact to update the content such that the content is current. For example, social network longevity program 108 may transform the format of the social artifact from a text message to a scrolling message. In another example, social network longevity program 108 may transform the social artifact from audio to text. In a further example, social network longevity program 108 may change the color, font, or look of the content to match that of the best second user. In yet another example, social network longevity program 108 may apply a filter to age the content or to label the content to indicate that the content was the original work of a different user.

In an embodiment, social network longevity program 108 may embed the ancestor artifact in the transferred artifact to indicate a visual lineage of the social artifact. For example, social network longevity program 108 may show the transferred artifact with an audit log or with multiple versions to display any changes made to the content, such that a user is able to understand where and from whom the content originated. In an embodiment, social network longevity program 108 may assign a version number based on the lineage.

In one embodiment, the transferred social artifact may subsequently be available only to the best second user in a private search. In another embodiment, the transferred social artifact may be available to users that are in the social network of both the first user and the second user. In yet another embodiment, the transferred social artifact may be available to any second users that interacted with the original social artifact via the account of the best second user. In an embodiment, social network longevity program 108 may request that the best second user disposition content of the transferred social artifact to, for example, hide or eliminate any embarrassing content.

In an example, Alice is a user of social network service 106. Alice posts the social artifact "fantastic—a great trip to the national park!" Social network longevity program 108 detects Alice's post. Bob likes Alice's post, and comments "so many great memories, I can't wait to go back!" Social network longevity program 108 stores Bob's modality actions, i.e., the like and the comment, in social network database 110. After a period of time, social network longevity program 108 determines that Alice is no longer active in social network service 106. Social network longevity program 108 determines, based on the modality actions, that Bob is the best second user for the social artifact. Social network longevity program 108 transfers the social artifact to Bob. Now Bob is able to find Alice's post, even though Alice is no longer active.

Figure 3A:
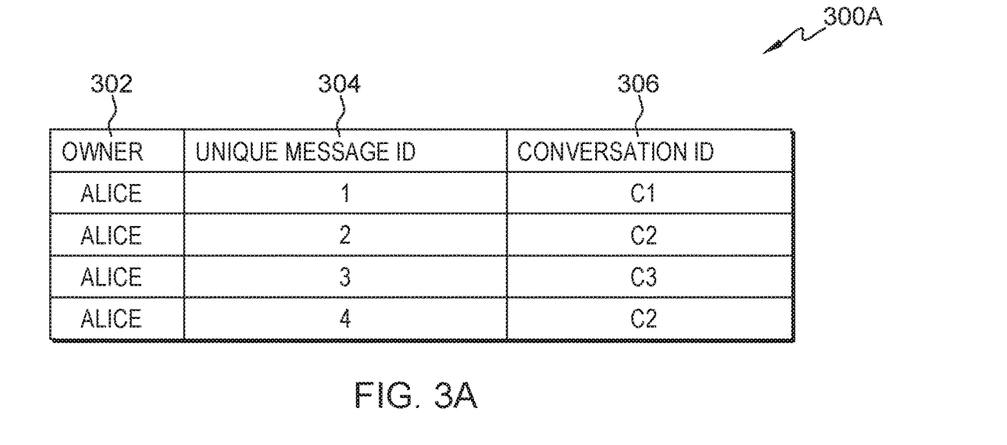
FIG. 3A depicts an example of social network data managed by the social network longevity program, in accordance with an embodiment of the present invention.

FIG. 3A depicts example table 300A of social network data managed by social network longevity program 108. Table 300A includes owner column 302, unique message ID column 304, and conversation ID column 306. As discussed with respect to step 204 of FIG. 2, in response to detecting a post of a social artifact by a first user, social network longevity program 108 stores the social artifact with identification information. In the example, the first user is identified as the owner, Alice. Table 300A lists four different unique message IDs and three different conversation IDs, as both unique message 2 and unique message 4 are associated with conversation two, i.e., C2. In the example, table 300A lists all messages on social network service 106 owned by Alice.

Figure 3B:
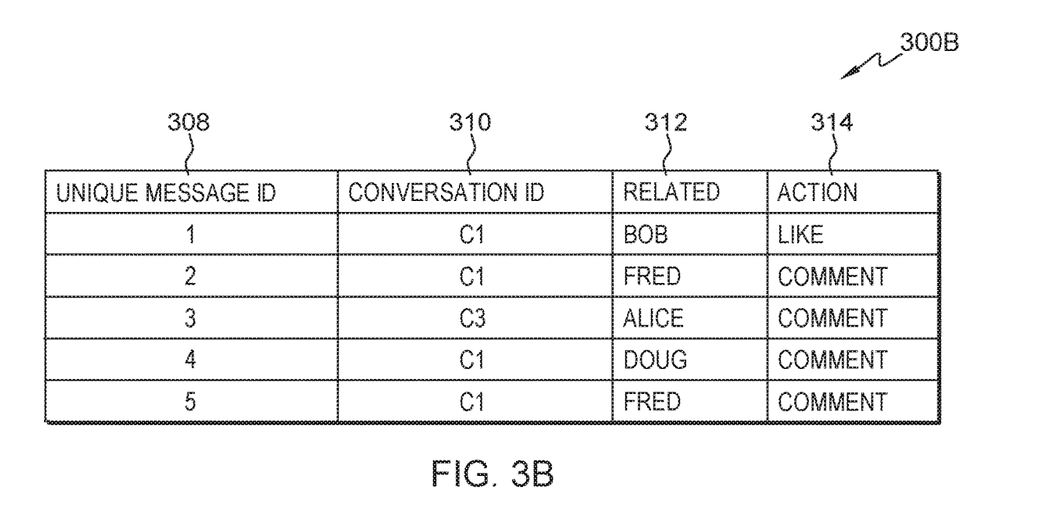
FIG. 3B depicts another example of social network data managed by the social network longevity program, in accordance with an embodiment of the present invention.

FIG. 3B depicts example table 300B of social network data managed by social network longevity program 108. Table 300B includes unique message ID column 308, conversation ID column 310, related column 312, and action column 314. Related column 312 lists users that interacted with a conversation belonging to Alice, including Alice herself. Action column 314 lists the action that the related user took with respect to the conversation belonging to Alice, i.e., the metadata of the conversation. For example, related column 312 indicates that Bob "liked" conversation C1, while Fred made a comment on conversation C1. As discussed with respect to step 206, social network longevity program 108 stores the activity of other users with each social artifact posted by the first user, i.e., the owner. In an embodiment, social network longevity program 108 transforms the data in table 300B into a useful data frame or data structure.

As discussed with respect to step 210, social network longevity program 108 then uses the useful data structures in a data analysis or loads the data structures into a graph processing structure in order to statistically determine the best second user. For example, as may be recognized by one of skill in the art, social network longevity program 108 transforms the data into a one-hot encoding and uses a K-nearest neighbor technique to generate clusters around conversations. Social network longevity program 108 may select the number of users and/or the number of conversations in the calculation. For example, based on the data displayed in table 300B, social network longevity program 108 can determine that conversation one, C1, naturally groups around Fred because Fred is listed as taking two actions with respect to C1, while Bob and Doug only took one action with respect to C1. In another embodiment, social network longevity program 108 may group C1 with Fred in a more qualitative approach. For example, social network longevity program 108 may determine that Alice replied "thank you" to Fred's comment, giving Fred's comment more weight in the calculation to select a best second user, since, based on sentiment analysis, Alice appeared to appreciate Fred's comment. In an embodiment, social network longevity program 108 may use a distributed graph engine in order to build a least cost shortest path based on the data in table 300B in order to link the first user with a best second user. In the embodiment, where there are ties in the costs, social network longevity program 108 may select both second users. In one embodiment, the assignment of best second user may appear as: Owner: Alice; Target: Fred; Artifact: C1. In another embodiment, social network longevity program 108 may query the data of table 300B and use one or more natural language processing (NLP) techniques to group the second users by the uniqueness of the conversation and/or comments, based on concepts and profile data associated with the owner and the second users.

Figure 4:
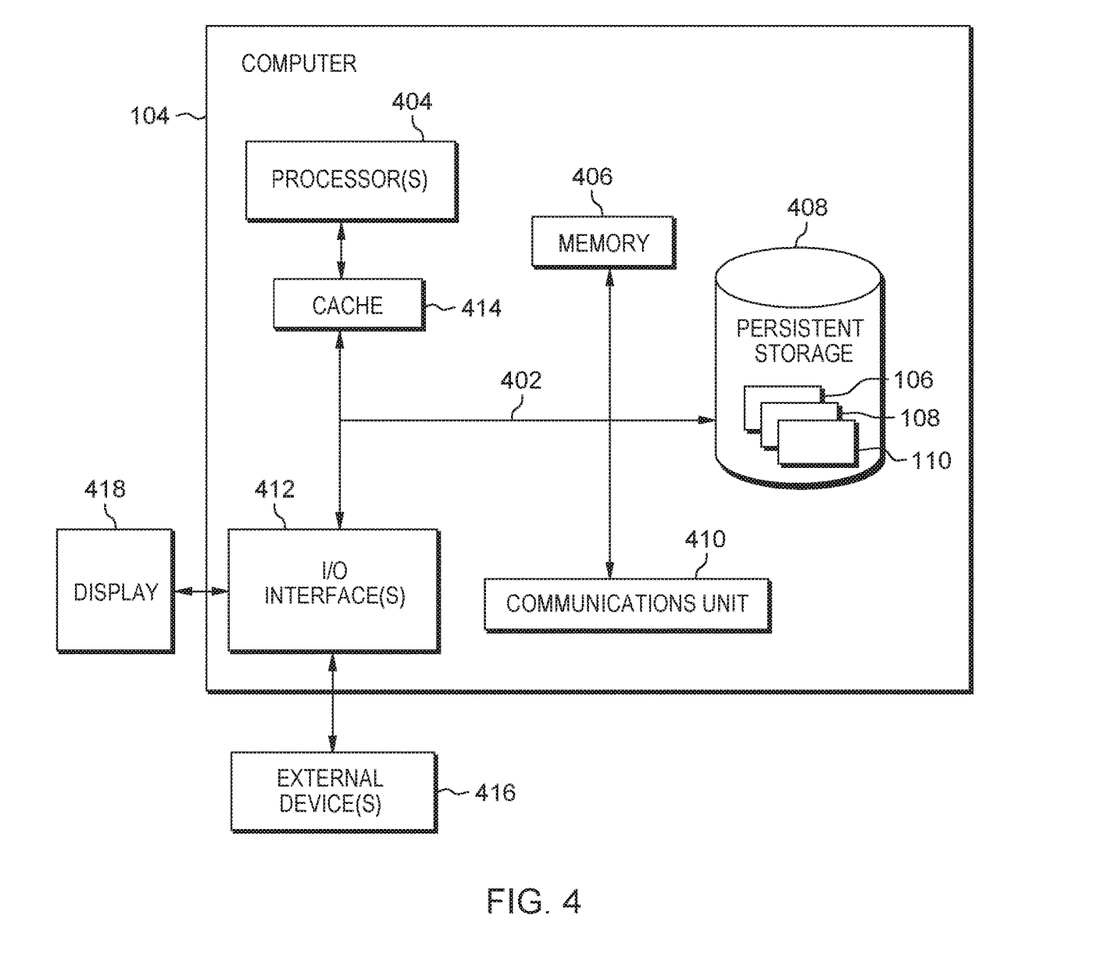
FIG. 4 depicts a block diagram of components of the server computer executing the social network longevity program within the distributed data processing environment of FIG. 1, in accordance with an embodiment of the present invention.

FIG. 4 depicts a block diagram of components of server computer 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 104 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., social network service 106, social network longevity program 108, and social network database 110, are stored in persistent storage 408 for execution and/or access by one or more of the respective processor(s) 404 of server computer 104 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 112 and client computing device 116. In these examples, communications unit 410 includes one or more network interface cards. Communications unit 410 may provide communications through the use of either or both physical and wireless communications links. Social network service 106, social network longevity program 108, social network database 110, and other programs and data used for implementation of the present invention, may be downloaded to persistent storage 408 of server computer 104 through communications unit 410.

I/O interface(s) 412 allows for input and output of data with other devices that may be connected to server computer 104. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., social network service 106, social network longevity program 108, and social network database 110 on server computer 104, can be stored on such portable computer readable storage media and can be loaded onto persistent storage 408 via I/O interface(s) 412. I/O interface(s) 412 also connect to display 418.

Display 418 provides a mechanism to display data to a user and may be, for example, a computer monitor. Display 418 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   detecting, by one or more computer processors, a posting of a social artifact by a first user of a social network;
   assigning, by one or more computer processors, associated identification information to the social artifact, wherein the associated identification information includes a message identifier, a conversation identifier, and a time of the posting of the social artifact;
   storing, by one or more computer processors, the social artifact with the associated identification information;
   storing, by one or more computer processors, activity associated with the social artifact by one or more other users;
   detecting, by one or more computer processors, a status change in an account associated with the first user, wherein the status change indicates receipt by the social network of a separation notice from the first user;

responsive to detecting the status change in the account associated with the first user, determining, by one or more computer processors, a second user from the one or more other users to which to transfer the social artifact based on the social artifact, the associated identification information, and the activity associated with the social artifact by the one or more other users; and transferring, by one or more computer processors, the social artifact to an account associated with the second user on the social network.

2. The computer-implemented method of claim 1, wherein the activity by the one or more other users associated with the social artifact is selected from the group consisting of: modality data, at least one of the one or more other users read the social artifact, at least one of the one or more other users liked the social artifact, at least one of the one or more other users disliked the social artifact, at least one of the one or more other users upvoted the social artifact, at least one of the one or more other users commented on the social artifact, identification information associated with the one or more other users, a correlation vector, a message identifier, a conversation identifier, at least one of the one or more other users to whom the social artifact was directed, at least one of the one or more other users copied on the social artifact, a textual reference to the one or more other users, a detail of the social artifact, a subject of the social artifact, a body of the social artifact, associated metadata, and a timestamp of the activity.

3. The computer-implemented method of claim 1, wherein detecting the status change in the account associated with the first user further comprises:

detecting, by one or more computer processors, a lack of activity by the first user in the account associated with the first user on the social network for a pre-defined threshold period of time.

4. The computer-implemented method of claim 1, wherein determining the second user from the one or more other users to which to transfer the social artifact based on the social artifact, the associated identification information, and the activity associated with the social artifact by the one or more other users further comprises:

determining, by one or more computer processors, the second user took more actions associated with the social artifact than any other user of the one or more users.

5. The computer-implemented method of claim 1, wherein transferring the social artifact to the account associated with the second user on the social network further comprises:

embedding, by one or more computer processors, the social artifact in a transferred second social artifact to indicate a visual lineage of the social artifact.

6. The computer-implemented method of claim 1, wherein the social artifact is selected from the group consisting of: a text message, a text comment, a text conversation, a still image, a video, and an audio clip.

7. A computer program product comprising:

one or more computer readable storage media and program instructions collectively stored on the one or more computer readable storage media, the stored program instructions comprising:

program instructions to detect a posting of a social artifact by a first user of a social network;

program instructions to assign associated identification information to the social artifact, wherein the associated identification information includes a message identifier, a conversation identifier, and a time of the posting of the social artifact;

program instructions to store the social artifact with associated identification information;

program instructions to store activity associated with the social artifact by one or more other users;

program instructions to detect a status change in an account associated with the first user, wherein the status change indicates receipt by the social network of a separation notice from the first user;

responsive to detecting the status change in the account associated with the first user, program instructions to determine a second user from the one or more other users to which to transfer the social artifact based on the social artifact, the associated identification information, and the activity associated with the social artifact by the one or more other users; and program instructions to transfer the social artifact to an account associated with the second user on the social network.

8. The computer program product of claim 7, wherein the activity by the one or more other users associated with the social artifact is selected from the group consisting of: modality data, at least one of the one or more other users read the social artifact, at least one of the one or more other users liked the social artifact, at least one of the one or more other users disliked the social artifact, at least one of the one or more other users upvoted the social artifact, at least one of the one or more other users commented on the social artifact, identification information associated with the one or more other users, a correlation vector, a message identifier, a conversation identifier, at least one of the one or more other users to whom the social artifact was directed, at least one of the one or more other users copied on the social artifact, a textual reference to the one or more other users, a detail of the social artifact, a subject of the social artifact, a body of the social artifact, associated metadata, and a timestamp of the activity.

9. The computer program product of claim 7, wherein the program instructions to detect the status change in the account associated with the first user comprise:

program instructions to detect a lack of activity by the first user in the account associated with the first user on the social network for a pre-defined threshold period of time.

10. The computer program product of claim 7, wherein the program instructions to determine the second user from the one or more other users to which to transfer the social artifact based on the social artifact, the associated identification information, and the activity associated with the social artifact by the one or more other users comprise:

program instructions to determine the second user took more actions associated with the social artifact than any other user of the one or more users.

11. The computer program product of claim 7, wherein the program instructions to transfer the social artifact to the account associated with the second user on the social network comprise:

program instructions to embed the social artifact in a transferred second social artifact to indicate a visual lineage of the social artifact.

12. The computer program product of claim 7, wherein the social artifact is selected from the group consisting of: a text message, a text comment, a text conversation, a still image, a video, and an audio clip.

13. A computer system comprising:
one or more computer processors;
one or more computer readable storage media;
program instructions collectively stored on the one or more computer readable storage media for execution by at least one of the one or more computer processors, the stored program instructions comprising:
program instructions to detect a posting of a social artifact by a first user of a social network;
program instructions to assign associated identification information to the social artifact, wherein the associated identification information includes a message identifier, a conversation identifier, and a time of the posting of the social artifact;
program instructions to store the social artifact with associated identification information;
program instructions to store activity associated with the social artifact by one or more other users;
program instructions to detect a status change in an account associated with the first user, wherein the status change indicates receipt by the social network of a separation notice from the first user;
responsive to detecting the status change in the account associated with the first user, program instructions to determine a second user from the one or more other users to which to transfer the social artifact based on the social artifact, the associated identification information, and the activity associated with the social artifact by the one or more other users; and
program instructions to transfer the social artifact to an account associated with the second user on the social network.

14. The computer system of claim 13, wherein the activity by the one or more other users associated with the social artifact is selected from the group consisting of: modality data, at least one of the one or more other users read the social artifact, at least one of the one or more other users liked the social artifact, at least one of the one or more other users disliked the social artifact, at least one of the one or more other users upvoted the social artifact, at least one of the one or more other users commented on the social artifact, identification information associated with the one or more other users, a correlation vector, a message identifier, a conversation identifier, at least one of the one or more other users to whom the social artifact was directed, at least one of the one or more other users copied on the social artifact, a textual reference to the one or more other users, a detail of the social artifact, a subject of the social artifact, a body of the social artifact, associated metadata, and a timestamp of the activity.

15. The computer system of claim 13, wherein the program instructions to detect the status change in the account associated with the first user comprise:
program instructions to detect a lack of activity by the first user in the account associated with the first user on the social network for a pre-defined threshold period of time.

16. The computer system of claim 13, wherein the program instructions to determine the second user from the one or more other users to which to transfer the social artifact based on the social artifact, the associated identification information, and the activity associated with the social artifact by the one or more other users comprise:
program instructions to determine the second user took more actions associated with the social artifact than any other user of the one or more users.

17. The computer system of claim 13, wherein the program instructions to transfer the social artifact to the account associated with the second user on the social network comprise:
program instructions to embed the social artifact in a transferred second social artifact to indicate a visual lineage of the social artifact.

* * * * *